US011151994B2

(12) United States Patent
Kwatra et al.

(10) Patent No.: US 11,151,994 B2
(45) Date of Patent: Oct. 19, 2021

(54) METHODS AND SYSTEMS FOR MANAGING VOICE COMMANDS AND THE EXECUTION THEREOF

(71) Applicant: INTERNATIONAL BUSINESS MACHINES CORPORATION, Armonk, NY (US)

(72) Inventors: Shikhar Kwatra, Durham, NC (US); Sushain Pandit, Austin, TX (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 198 days.

(21) Appl. No.: 16/240,332

(22) Filed: Jan. 4, 2019

(65) Prior Publication Data

US 2020/0219499 A1    Jul. 9, 2020

(51) Int. Cl.
*G10L 15/22*     (2006.01)
*G06F 3/16*      (2006.01)
*G06N 20/00*     (2019.01)

(52) U.S. Cl.
CPC .............. *G10L 15/22* (2013.01); *G06F 3/167* (2013.01); *G06N 20/00* (2019.01); *G10L 2015/223* (2013.01); *G10L 2015/227* (2013.01)

(58) Field of Classification Search
None
See application file for complete search history.

(56) References Cited

U.S. PATENT DOCUMENTS

| 9,100,694 B1 * | 8/2015 | Chandel ............... H04N 21/485 |
| 9,368,105 B1 * | 6/2016 | Freed ........................ G10L 15/22 |
| 2012/0232906 A1 * | 9/2012 | Lindahl ................... G10L 15/30 704/270.1 |
| 2015/0180742 A1 | 3/2015 | Zadig |
| 2016/0364382 A1 | 12/2016 | Sarikaya |
| 2019/0043492 A1 * | 2/2019 | Lang ....................... G10L 15/22 |

* cited by examiner

*Primary Examiner* — Nafiz E Hoque
(74) *Attorney, Agent, or Firm* — Griffiths & Seaton PLLC

(57) ABSTRACT

Embodiments for managing voice commands by one or more processors are described. The receiving of a voice command from an individual is detected. An action associated with the voice command is caused to be at least temporarily prevented from being executed based on at least one data source associated with the individual.

18 Claims, 5 Drawing Sheets

METHODS AND SYSTEMS FOR MANAGING VOICE COMMANDS AND THE EXECUTION THEREOF

BACKGROUND OF THE INVENTION

Field of the Invention

The present invention relates in general to computing systems, and more particularly, to various embodiments for managing voice commands and the execution thereof.

Description of the Related Art

Voice response systems (e.g., artificial intelligence (AI) voice response systems, virtual assistants, chatbots, interactive agents, Artificial Conversational Entities (ACEs), etc.), are computer nodes (i.e., devices and/or programs) or artificial intelligence modules which are able to conduct conversations with individuals (or users) through auditory (e.g., speech/voice) methods (and/or in some instances, text-based methods). Such programs are often designed to convincingly simulate how humans behave as conversational partners. As such, users may ask questions, and the system answers (or responds) based on its knowledge base and/or by analyzing the question, providing the best answer it can generate. Additionally, some voice response systems may be used to perform various types of actions, such as controlling computing devices/nodes and "internet of things" (IoT) devices, in response to spoken/voice commands and/or requests.

However, in some instances, when a voice command is received, it may be considered to be undesirable for the voice command, or an action associated with the voice command, to be carried out or executed. In particular, given the particular circumstances (or situational/environmental conditions) in which the voice command was provided or received, it may or may not be desirable to execute the associated action.

SUMMARY OF THE INVENTION

Various embodiments for managing voice commands by one or more processors are described. In one embodiment, by way of example only, a method for managing voice commands, again by one or more processors, is provided. The receiving of a voice command from an individual is detected. An action associated with the voice command is caused to be at least temporarily prevented from being executed based on at least one data source associated with the individual.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
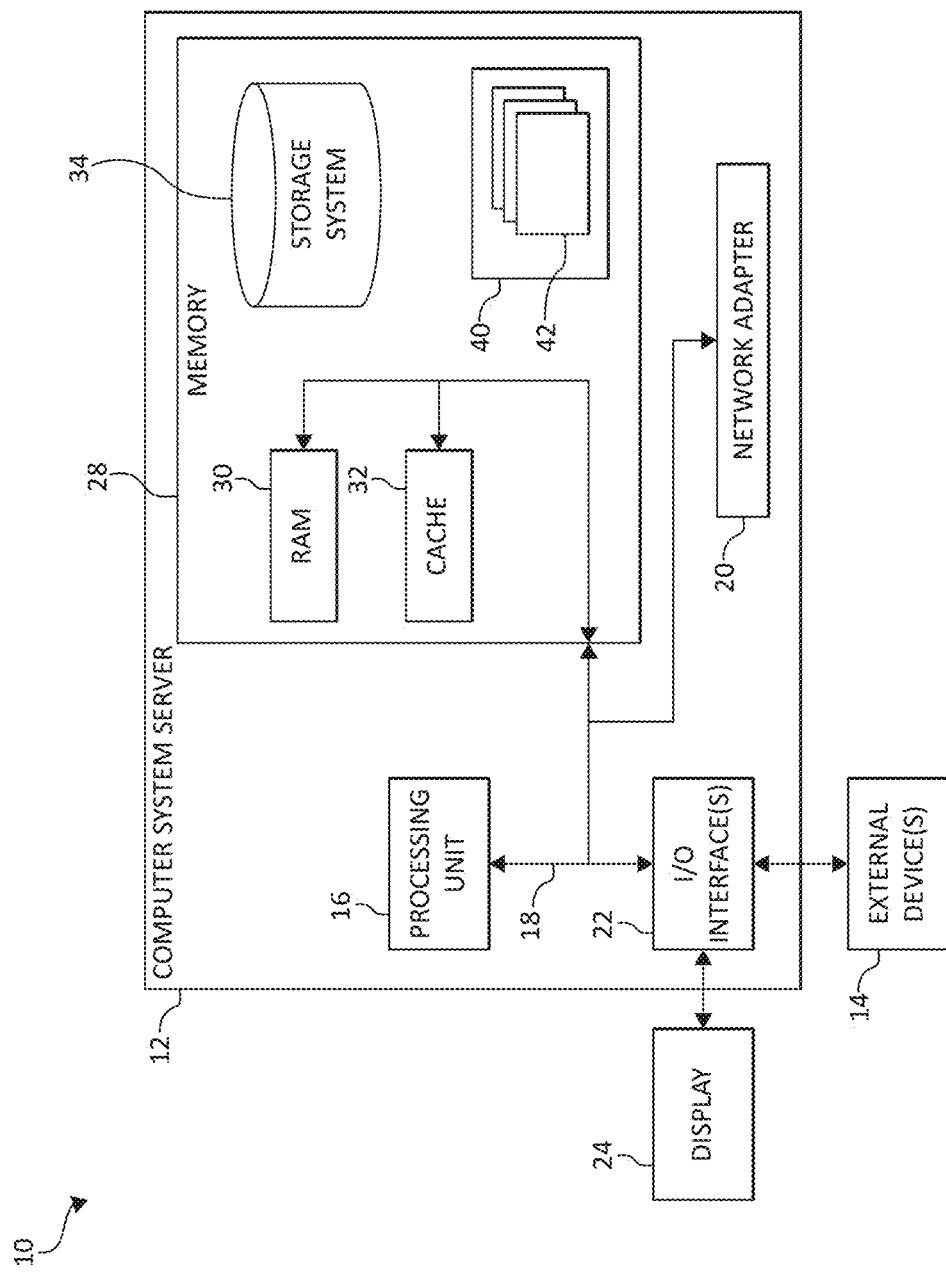
FIG. 1 is a block diagram depicting an exemplary computing node according to an embodiment of the present invention.

As discussed above, voice response systems (e.g., artificial intelligence (AI) voice response systems, virtual assistants, chatbots, interactive agents, Artificial Conversational Entities (ACEs), etc.), are computer nodes (i.e., devices and/or programs) or artificial intelligence modules which are able to conduct conversations with individuals (or users) through auditory (e.g., speech/voice) methods (and/or in some instances, text-based methods). Such programs are often designed to convincingly simulate how humans behave as conversational partners. As such, users may ask questions, and the system answers (or responds) based on its knowledge base and/or by analyzing the question, providing the best answer it can generate. Additionally, some voice response systems may be used to perform various types of actions, such as controlling computing devices/nodes and "internet of things" (IoT) devices, in response to spoken/voice commands and/or requests.

However, in some instances, when a voice command is received, it may be considered to be undesirable for the voice command, or an action associated with the voice command, to be carried out or executed. In particular, given the particular circumstances (or situational/environmental conditions) in which the voice command was provided or received, it may or may not be desirable to execute the associated action.

As one example, consider a scenario in which one individual is sleeping, and a user (or another individual) provides a voice command to increase the volume of music being rendered (or "played") or a television in the vicinity of the sleeping individual. In such an instance, it may not be desirable to perform the requested action (at least not without a delay or a warning being provided), as it may lead to the individual be woken or disturbed.

As another example, consider a scenario in which a person is performing a task that requires their concentration or attention, such as working or studying. In such a case, if a voice command is received to activate (or "turn on") a television in the same room, performing such an action may result in the person becoming distracted.

Thus, what is needed are methods and systems by which voice response systems (and/or computing systems controlling such systems) are able to determine whether or not the action associated with a received (or detected) voice command (or request) "should be" executed given the particular circumstances in which the command was given. In other words, what are needed are voice response systems that are able to determine whether or not it is desirable to execute the received voice command, at least without a delay, a warning being provided to the user, and/or a reason for the delay (or denial) of the action being provided.

To address these needs, some embodiments described herein provide methods and systems for managing voice commands (and/or voice response systems) in such a way that the system is provided access to, for example, various types of data (or data sources) associated with the individual providing the voice command (and/or other individuals or entities) to determine whether or not to execute the command (and/or the action associated therewith) and/or execute the command without a delay, warning, and/or notification.

In some embodiments, the data sources that are analyzed to determine if a voice command is to be executed or not (or whether or not the command should be executed) include, for example, a historical record of interactions between the user and the voice response system (e.g., previous commands, previous actions taken in response to the commands, etc.), a profile (e.g., cognitive profile) of the user, and/or a detected situational condition (or surrounding context) associated with the individual (e.g., determined utilizing cameras, speakers, microphones, the detected presence/operation of computing devices, etc.). In some embodiments, the analysis (and/or the management of voice commands described herein) is performed utilizing a cognitive analysis (e.g., a cognitive analysis of the available data and/or a cognitive analysis utilized to generate a cognitive profile of the user).

In some embodiments, the system analyzes, for example, historical interaction patterns of the user with the voice response system including, for example, the type of voice command(s), the surrounding context when the command(s) is submitted, adjustments in or made by the commands, etc. Utilizing such, the system may generate rules related to the execution of voice commands (or the associated actions) in particular situations (e.g., type of command, context, etc.).

For example, the system may gather information related to a particular vicinity (e.g., a room or portion of a house) using, for example, cameras and microphones, to identify a particular context or scenario, such as a sleeping individual or a person working or studying. The system may also identify actions taken (e.g., via voice commands) by the user in such a situation. For example, the user may initially set the volume of music or television to relatively high level, but then reduced the volume when the individual went to bed or when they began to work or study. Using such information, the system may determine that a voice command to increase the volume should not be executed if the situation has not changed (e.g., the person is still sleeping or studying).

As such, in some embodiments, when a voice command is received (or detected), the system determines if execution of the voice command (or the associated action) is appropriate given, for example, the current situational condition(s). If execution of the voice command is determined to not be appropriate (or desirable), the command (or action) may not be executed (at least not immediately). In some embodiments, when a voice command is not executed (or is denied), an appropriate notification may be generated and provided to the user (e.g., informing the user why the voice command is not appropriate and/or warning the user about the potential effect(s) of executing the voice command).

For example, in a scenario in which the system has determined that an individual is studying, and the user provides a voice command to increase the volume of (or turn on) a television, execution of the voice command may be denied (at least temporarily). Also, the user may be provided with a notification as to why the voice command was denied. For example, an electronic message, such as a text message, email, or via a pop-up window, may be sent to the user and/or rendered by the user's device (e.g., the user's mobile electronic device, such as a mobile phone or tablet device).

In some embodiments, user feedback is utilized by the system to adjust the operation thereof. For example, the system may utilize feedback to determine if its interpretation of the particular contextual scenario is not appropriate. In such situations, the system may accordingly adjust its operation in later instances (e.g., via machine learning, cognitive analysis, etc.).

For example, the system may observe (or detect) a situation in which a user initially increases the volume on a television (or has the television volume set to a relatively high level) and then decreases the volume (e.g., via voice commands). The system may also observe (e.g., via a camera) another individual (e.g., a particular individual) is in close proximity to the user and/or the television when the volume is reduced. Based on such input, the system may determine that it is generally appropriate to deny voice commands to increase the volume of the television when that individual (or another individual of a similar age, family role, etc.) is in close proximity to the television. However, the user may override this condition via explicit feedback (e.g., via voice prompts/commands, text-based methods, etc.) by indicating that the reason for reducing the volume of the television was a particular "point-in-time" occurrence (e.g., the door bell rang or the user received a phone call) that should not be utilized as a data point for training/learning purposes.

In some embodiments, the system identifies the situational context, or changes in the context, and uses such to change or modify the received voice command (and/or the associated action). For example, a modified version of the voice command, perhaps falling within maximum and/or minimum values, may be executed based on the particular situational conditions.

For example, the system may determine that an individual is working or studying in one room of a house, and the user provides a voice command to increase the volume of a television in another room of the house. In such a situation, the system may automatically adjust the voice command so the volume remains below a predetermined level. That is, if the voice command is associated with increasing the volume of the television, for example, from 40% of maximum volume to 80% of maximum volume, and it has been determined that given the current situation (e.g., the individual is studying in the next room) the volume should not exceed 60% of maximum volume, the system may modify the voice command to increase the volume to 60% of maximum volume. As such, in some embodiments, the user may not have to specify device setting/parameter (e.g., volume). Rather, the system may automatically select the appropriate setting given the current situation and cause the action to be appropriately executed.

In some embodiments, the system utilizes different profiles/settings for different users such that the conditions/rules that are followed change depending on which user is providing the voice command, as well as the situational condition(s). For example, the system may utilize voice or speaker recognition, as is commonly understood, to differentiate between different users and utilize such to adjust the management of voice commands as described herein (e.g., the system may respond differently to voice commands provided by different users).

For example, if the system has determined that an individual is sleeping, the system may respond differently depending on which user provides a voice command that could disrupt the sleeping individual. That is, if one individual is determined to be the user providing a voice command to adjust climate control, the system may not execute (or may deny) the change in climate control, given preferential treatment to the well-being of the sleeping individual (e.g., based on age, family role, etc.). However, if the user is determined to a different individual, the voice command (and/or the user) may be given preferential treatment, allowing the voice command to be executed.

In some embodiments, a cognitive analysis may be used to perform the voice command (or voice response system) management described herein. In some embodiments, the cognitive analysis includes analyzing various data sources associated with the voice command, the individual making the voice command, and/or the situational condition(s) in which the voice command is given. The data sources may include, for example, a historical record of interactions between the user and the voice response system (e.g., previous commands, previous actions taken in response to the commands, etc.), a profile (e.g., cognitive profile) of the user, and/or a detected situational condition (or surrounding context) associated with the individual (e.g., determined utilizing cameras, speakers, microphones, the detected presence/operation of computing devices, etc.). Profiles (e.g., cognitive profiles) for users may be generated based on any appropriate data sources associated with the users that are accessible by the system (perhaps with the permission or authorization of the user). Examples of such data sources include, but are not limited to, computing systems/devices/nodes (e.g., IoT devices) associated with the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, age, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

The cognitive analysis may also include classifying natural language, analyzing tone, and analyzing sentiment (e.g., scanning for keywords, key phrases, etc.) with respect to, for example, communications sent to and/or received/detected by voice response systems. In some embodiments, Mel-frequency cepstral coefficients (MFCCs) and natural language processing (NLP) may be used. It should be understood that the embodiments described herein may be applied to systems besides voice response systems, such as those through which commands are received via text-based methods (e.g., via a keyboard). Over time, the methods and systems described herein may determine correlations (or insights) between communications (e.g., voice commands) received by voice response systems and actions associated with the communications, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of voice response system operation as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a voice response system, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing voice commands by one or more processors is provided. The receiving of a voice command from an individual is detected. An action associated with the voice command is caused to be at least temporarily prevented from being executed based on at least one data source associated with the individual. A signal representative of said at least temporary prevention of the execution of the action may be generated.

The action associated with the voice command may be performable by a computing device. The causing of the action associated with the voice command to be at least temporarily prevented from being executed may be performed utilizing a cognitive analysis of the at least one data source.

A notification of a reason for said at least temporary prevention of the execution of the action may be generated (e.g., based on the generated signal).

The at least one data source may include at least one of previous voice commands received from the individual and previous actions performed in response to receiving previous voice commands received from the individual. The at least one data source may include at least one of a cognitive profile of the individual and a detected situational condition associated with the individual.

A modified action may be determined based on the received voice command and the at least one data source associated with the individual. The modified action may be caused to be executed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a voice response system and/or in/through which a voice response system may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
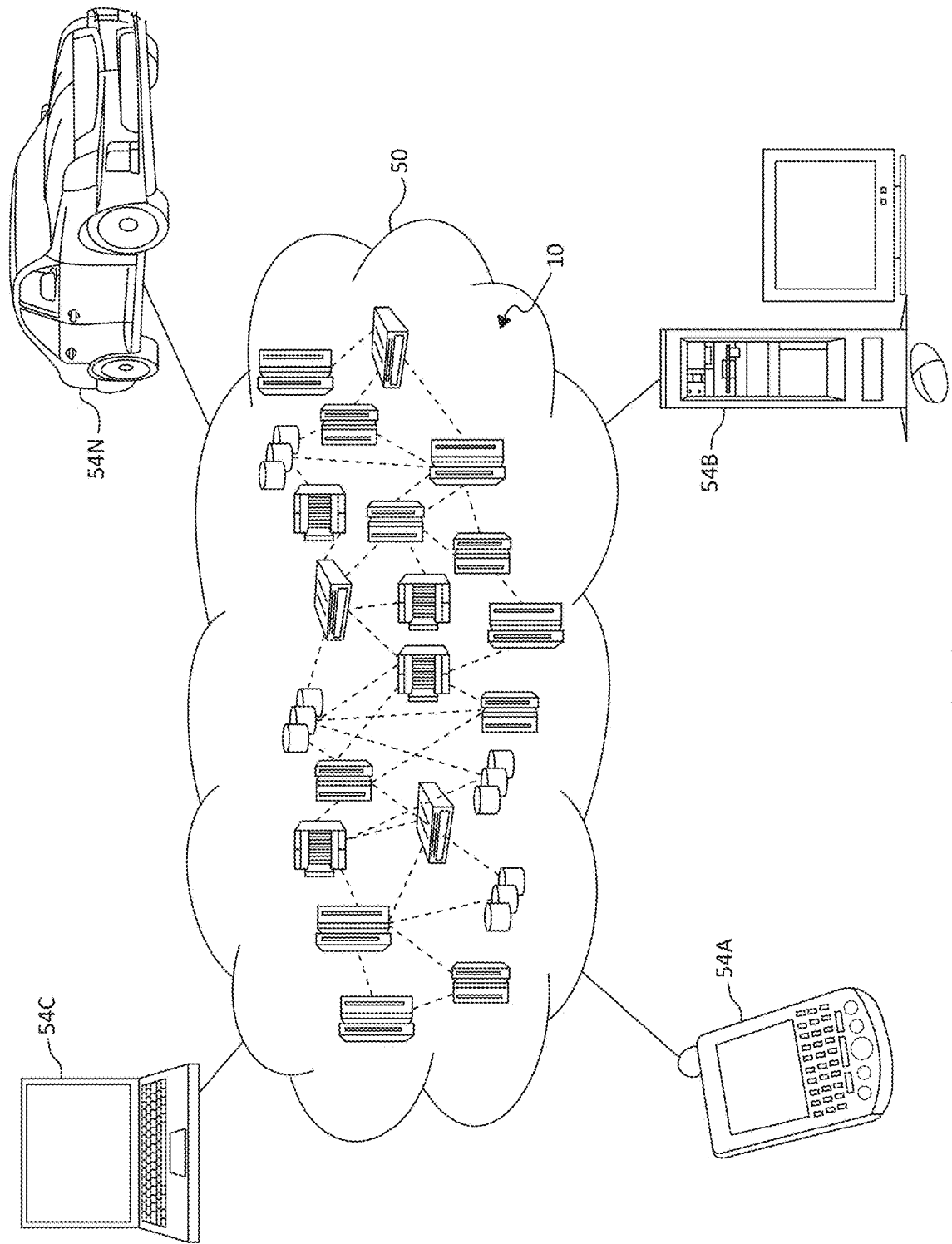
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
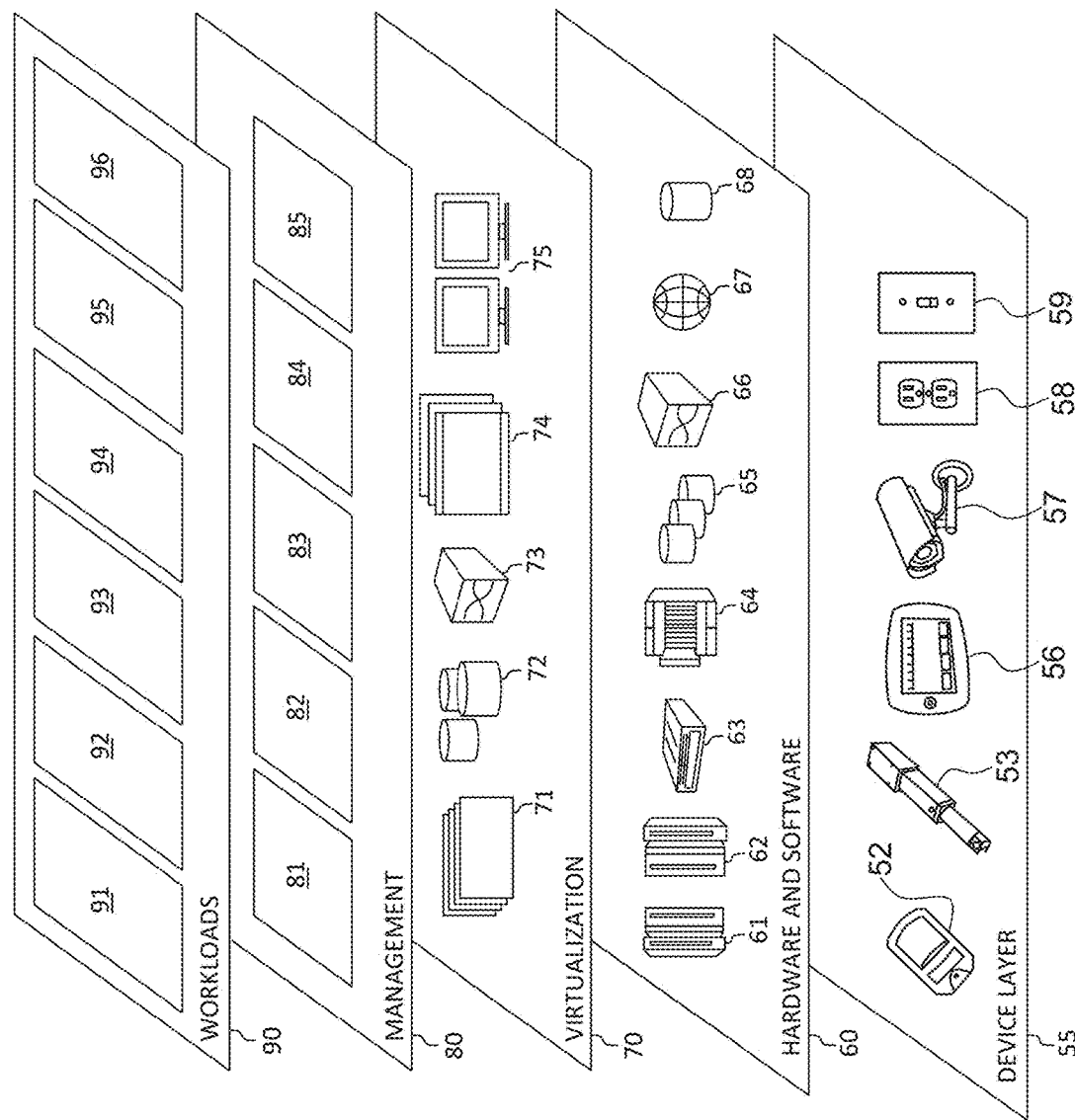
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing voice response systems (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that, for example, manage voice commands (and/or voice response systems) in such a way that the system is provided access to, for example, various types of data (or data sources) associated with the individual providing the voice command (and/or other individuals or entities) to determine whether or not to execute the command (and/or the action associated therewith) and/or execute the command without a delay, warning, and/or notification. The data sources that are analyzed to determine if a voice command is to be executed or not (or whether or not the command should be executed) include, for example, a historical record of interactions between the user and the voice response system (e.g., previous commands, previous actions taken in response to the commands, etc.), a profile (e.g., cognitive profile) of the user, and/or a detected situational condition (or surrounding context) associated with the individual (e.g., determined utilizing cameras, speakers, microphones, the detected presence/operation of computing devices, etc.). In some embodiments, the analysis (and/or the management of voice commands described herein) is performed utilizing a cognitive analysis (e.g., a cognitive analysis of the available data and/or a cognitive analysis utilized to generate a cognitive profile of the user).

In some embodiments, the voice response system is in operable communication with other computing devices (i.e., at least one computing device) that are able to perform or execute voice commands (or the actions associated therewith), and perhaps various types of sensors. For example, the voice response system may be in operable communication with various types of computing systems (e.g., desktop PCs, laptops, etc.) and/or various types of IoT devices and/or home network devices, such as televisions, sound/music systems, climate control systems, lighting systems, various types of appliances (e.g., microwaves, ovens, refrigerators, etc., and/or any other type of device that me be able to perform an action that is associated with a voice command. Additionally, the voice response system (or a computing system controlling/managing the voice response system) may be in operable communication with various types of sensors that may be used to detect/monitor the situational condition(s) associated with voice commands (or the contextual environment in which the voice commands are given), such as cameras, microphones, motion sensors, and computing systems/devices that are able to detect the presence of other computing devices in the vicinity (e.g., via wireless communication).

In some embodiments, several parameters with respect to a user's profile and/or surroundings may be utilized, for example, in training the machine learning model. For example, details of a confined area or vicinity of the environment surrounding the user's device(s) (e.g., a mobile phone) where content (e.g., audio and/or video content) is being rendered by a computing device (or IoT device) or an action is being taken with respect to another computing device may be considered, such as a size of the area (e.g., room size) and which devices are detected within the area. Geo-spatial metrics of individuals (or users) within the area may also be used (e.g., gait or sounds analysis to determine the proximity of users to the device associated with the voice command(s)). Also, the user's action(s), voice command(s), and/or instruction(s) to the voice response system may also be considered.

In some embodiments, various methods for detecting the presence of a user or group of users within the area or proximal areas and/or the approach of one or more users towards such areas may be utilized. For example, gait analysis may be utilized that may be based on, for example, sound/cadence, computer vision (e.g., without red, green, and blue (RGB)), sensors onboard various devices (e.g., mobile devices/phones, smart watches, smart eye lenses, etc.), or other sensors (e.g., other cameras, motion sensors, etc.). In some embodiments, devices may be configured (e.g., in a set up/initial phase) for particular users or groups of users. Additionally, sound/voice analysis may be utilized to determine the identity of the user providing the voice command and/or how far they are from a particular device (e.g., the device associated with the received voice command). Facial and/or image recognition may also be used (e.g., via cameras). Further, historical data and user-defined preferences may also be used.

In some embodiments, when a voice command is submitted (or received or detected), the voice response system may analyze the voice command using, for example, Mel-frequency cepstral coefficients (MFCCs). The system may also gather data from various sensors (e.g., cameras, microphones, etc.) to identify or classify the surrounding context and/or situational condition(s).

The system may identify an adjustment being made by the voice command (e.g., a reduction in volume of music or television). The adjustment (or other action) and/or the parameter(s)/setting(s) associated with the adjustment may be correlated to the surround context in which the voice command was given.

In some embodiments, the voice response system gathers and/or utilizes historical (or previous) voice commands, the adjustments/changes/actions made in response to the voice commands, and the circumstances in which the commands were given. Using such, the system may create rules for allowing or (at least temporarily) denying the actions associated with voice commands based on the surrounding context (or circumstances).

In some embodiments, user feedback is utilized to improve the performance of the system over time. For example, if a user determines that the system's interpretation of a particular situation is not appropriate (e.g., a voice command was denied because the system incorrectly interpreted the situation), the user may provide an indication of such (e.g., via a voice prompt or text-based means via a computing node). The system may utilize such for training with respect to classifying such situations and/or to "relearn" how to handle similar situations in the future.

The voice response system may identify maximum and/or minimum allowed parameters for particular situational conditions and use such when determining whether or not a particular voice command (or the action associated therewith) is appropriate and/or to modify the voice command. For example, if a voice command to adjust a volume or lighting setting beyond the determined maximum/minimum setting, the system may execute the voice command in a modified form (e.g., to keep the parameter within the maximum/minimum settings). In some embodiments, maximum/minimum setting values for various devices may be stored in a database that is accessible by the voice response system.

In some embodiments, the voice response system analyzes received (or detected) voice commands and compares them to the detected situational condition(s) or surrounding context to identity or determine the action that should be executed (or carried out). If a received voice command is determined to be associated with an action that is not appropriate for the situational condition(s), execution of the action is (at least temporarily) denied or a modified version of the voice command (or action) is executed, as described above. In some embodiments, when the voice command is denied, a notification (e.g., electronic message) is provided to the user, which indicates why the voice command was not executed.

In some embodiments, the voice response system utilizes (or has access to) profiles of multiple users. The profiles may be utilized such that the voice response system performs/operates differently for different users. That is, a voice command from one user may be denied, while the same voice command from another user may be executed. As such, preferences and/or authorization settings may be different for different users.

Figure 4:
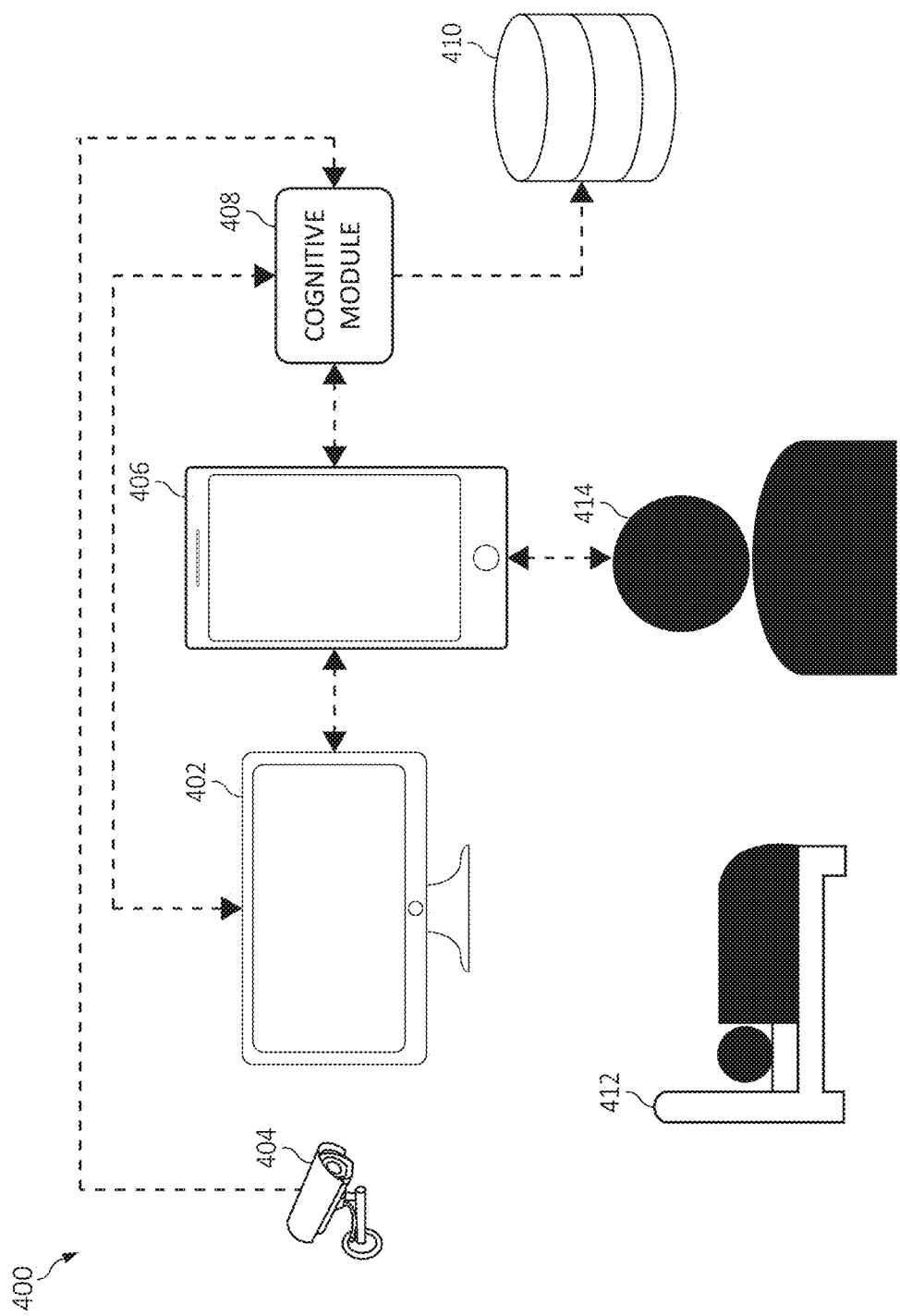
FIG. 4 is a plan view of an exemplary computing environment according to an embodiment of the present invention.

FIG. 4 illustrates an exemplary computing environment (or system) 400 according to an embodiment of the present invention. Within or included in the environment 400 are a smart (or IoT) television 402, a camera 404, and a mobile electronic device 406. Although a television 402 is shown in FIG. 4, it should be understood that the embodiments described herein may be applied to any sort of devices that are able to perform an action associated with a received voice command, such as sound/music systems, appliances, lighting systems, and various types of computing nodes (e.g., desktop PCs, servers, etc.). The camera 404 may be configured to monitor the vicinity surrounding the television (e.g., the room in which the television is utilized). It should be understood that other sensors may (also) be used, such as microphones, motion sensors, and computing devices that detect the presence of other computing devices (e.g., via wireless communications). In the depicted embodiment, the mobile electronic device 406 is a mobile phone. However, it should be understood that any computing device through which a voice response system may be utilized may be used, such as desktop PCs, tablet devices, and computing devices (e.g., control modules) dedicated to the operation/control of the voice response system.

In the depicted embodiment, the mobile device 406 is in operable communication (e.g., via wireless communications) with the television 402 and a cognitive module 408. The cognitive module 408 may include and/or be implemented within any suitable computing device, such as those described above (perhaps even the mobile device 406). The cognitive module 408 is in operable communication with the television 402, the camera 404, and a database (or memory) 410. The database 410 may be utilized to store previous voice commands, the actions performed in response to the voice commands, and/or the situational condition(s) (e.g., as detected by the camera 404) in which the voice commands were given. The database 410 and/or events/conditions stored thereon may be utilized by the cognitive module 408 (and/or the voice response system) in determining if it is appropriate to execute an action associated with a received voice command, as described above.

In the depicted embodiment, within the vicinity of the television 402, an individual (or person) 412 has been detected as sleeping (e.g., on a bed or sofa), perhaps utilizing the camera 404. A user (or individual) 414 may provide a voice command to the voice response system via the mobile device 406 (i.e., a microphone on the mobile device 406). For example, the user 414 may speak a voice command to increase the volume of or turn on the television 402. As described above, in response, the voice response system may analyze the situational condition(s) and/or the circumstances in which the voice command was given or received.

In the particular embodiment shown, because of the presence of the sleeping individual 412 in the vicinity of the television, the voice response system and/or the cognitive module 408 may determine, perhaps using historical data stored on the database 410, that the execution of the action associated with the voice command (i.e., increasing the volume of the television 402) is not appropriate (e.g., because it may disrupt the individual's sleep). In such an instance, the action may be prevented from being executed (at least without a delay). For example, as described above, the action may be prevented from being executed, and a notification may be provided to the user 414 (e.g., via a text message or pop-up window on the mobile device 406), which describes why the action was not executed (e.g., the notification may serve as an indication or reminder that the individual is sleeping). In some embodiments, the user 414 may be provided with an option to override the denial of the voice command by, for example, an explicit authorization and/or providing feedback that indicates that the system's interpretation of the situational condition(s) is not accurate.

However, in some embodiments, a modified version of the action may be executed. For example, if the voice command indicated that the user 414 desired to increase the volume of the television 402 from 40% of the maximum volume to 80% of the maximum volume, the voice response system (and/or the cognitive module 408) may cause the volume to only be increased to 60% of the maximum volume. Such an occurrence may arise from previous events observed/monitored by the voice response system (and/or the cognitive module 408) and perhaps stored in the database 410. For example, if the system has previously observed occurrences of the individual (or another individual) sleeping in the vicinity of the television 402 with the volume of the television set to 60% of the maximum volume, such may be utilized as training/leaning data.

Figure 5:
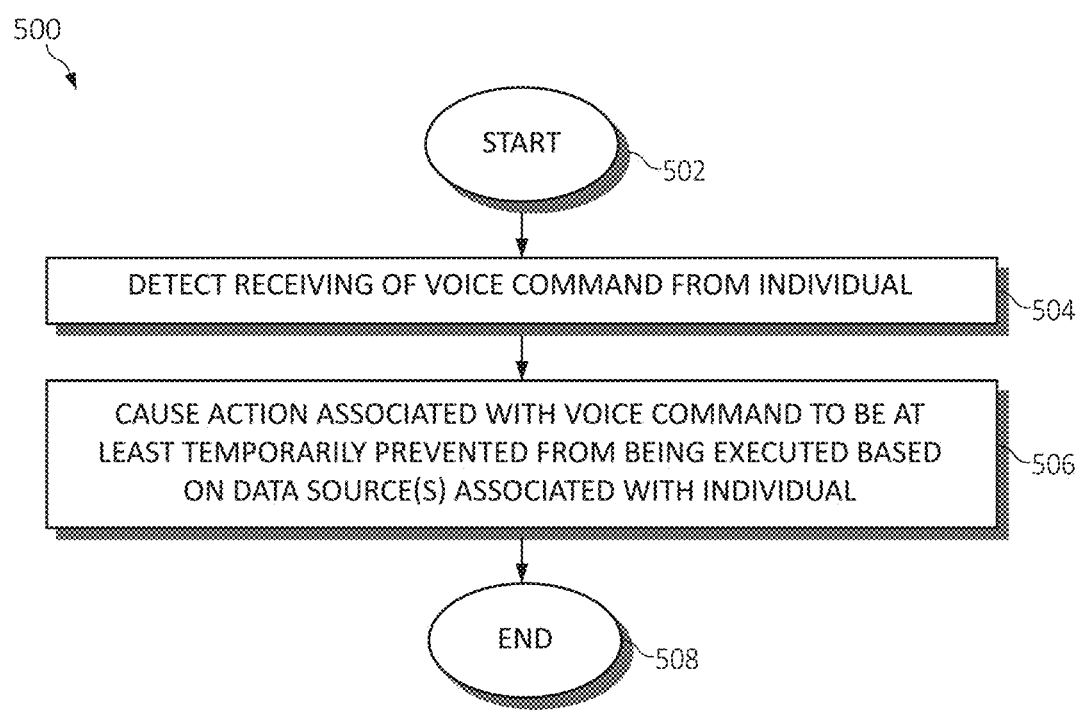
FIG. 5 is a flowchart diagram of an exemplary method for managing voice commands according to an embodiment of the present invention.

Turning to FIG. 5, a flowchart diagram of an exemplary method 500 for managing voice commands (and/or a voice response system), in accordance with various aspects of the present invention, is provided. Method 500 begins (step 502) with, for example, a voice response system being installed (or otherwise implemented) on or through a computing system/device/node, such as a mobile electronic device (e.g., a mobile phone, tablet device, etc.).

The receiving of a voice command from an individual is detected (step 504). The voice command may be detected by a microphone, such as one on a mobile electronic device or any other suitable computing node. The voice command may be associated with an action that is performable by a computing device, such as an IoT device (or vice versa).

An action associated with the voice command is caused to be at least temporarily prevented from being executed (or allowed to be executed) based on at least one data source associated with the individual (step 506). The causing of the action associated with the voice command to be at least temporarily prevented from being executed may be performed utilizing a cognitive analysis of the at least one data source. The at least one data source may include previous voice commands (e.g., received from the individual), previous actions performed in response to the previous voice commands, a cognitive profile of the individual, and/or a detected situational condition associated with the individual (and/or the device associated with the execution of the voice command).

A signal representative of said at least temporary prevention of the execution of the action may be generated. For example, a notification of a reason for said at least temporary prevention of the execution of the action may be generated. A modified action may be determined based on the received voice command and the at least one data source associated with the individual. The modified action may then be caused to be executed (e.g., instead of the original action called for by the received voice command).

Method 500 ends (step 508) with, for example, the action being prevented from being executed. The process may be repeated when a subsequent voice command is received or detected. The process may be repeated when a subsequent communication is received. In some embodiments, the user(s) may provide feedback related to the management of the chatbot, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing voice commands comprising:
   detecting the receiving of a voice command from an individual;
   causing an action associated with the voice command to be at least temporarily prevented from being executed based on at least one data source associated with the individual, wherein the at least one data source associated with the individual includes geo-spatial and contextual information of a detected situational condition occurring within an environment surrounding the individual as identified by at least one sensory device;
   generating a notification, provided to the individual, of a reason for said at least temporary prevention of the execution of the action; and
   upon receiving the notification, overriding the execution of the action from being at least temporarily prevented via explicit feedback from the individual indicating that the reason was a particular point-in-time occurrence and is exempt from being utilized as a data point in the at least one data source for future occurrences of a similar type that would cause execution of a future action from being at least temporarily prevented.

2. The method of claim 1, wherein the action associated with the voice command is performable by a computing device.

3. The method of claim 1, wherein the causing of the action associated with the voice command to be at least temporarily prevented from being executed is performed utilizing a cognitive analysis of the at least one data source.

4. The method of claim 1, wherein the at least one data source includes at least one of previous voice commands received from the individual and previous actions performed in response to receiving previous voice commands received from the individual.

5. The method of claim 1, wherein the at least one data source includes a cognitive profile of the individual.

6. The method of claim 1, further comprising:
   determining a modified action based on the received voice command and the at least one data source associated with the individual; and
   causing the modified action to be executed.

7. A system for managing voice commands comprising:
   at least one processor that
      detects the receiving of a voice command from an individual;
      causes an action associated with the voice command to be at least temporarily prevented from being executed based on at least one data source associated with the individual, wherein the at least one data source associated with the individual includes geo-spatial and contextual information of a detected situational condition occurring within an environment surrounding the individual as identified by at least one sensory device;
      generates a notification, provided to the individual, of a reason for said at least temporary prevention of the execution of the action; and
      upon receiving the notification, overrides the execution of the action from being at least temporarily prevented via explicit feedback from the individual indicating that the reason was a particular point-in-time occurrence and is exempt from being utilized as a data point in the at least one data source for future occurrences of a similar type that would cause execution of a future action from being at least temporarily prevented.

8. The system of claim 7, wherein the action associated with the voice command is performable by a computing device.

9. The system of claim 7, wherein the causing of the action associated with the voice command to be at least temporarily prevented from being executed is performed utilizing a cognitive analysis of the at least one data source.

10. The system of claim 7, wherein the at least one data source includes at least one of previous voice commands received from the individual and previous actions performed in response to receiving previous voice commands received from the individual.

11. The system of claim 7, wherein the at least one data source includes a cognitive profile of the individual.

12. The system of claim 7, wherein the at least one processor further:
  determines a modified action based on the received voice command and the at least one data source associated with the individual; and
  causes the modified action to be executed.

13. A computer program product for managing voice commands by one or more processors, the computer program product comprising a non-transitory computer-readable storage medium having computer-readable program code portions stored therein, the computer-readable program code portions comprising:
  an executable portion that detects the receiving of a voice command from an individual;
  an executable portion that causes an action associated with the voice command to be at least temporarily prevented from being executed based on at least one data source associated with the individual, wherein the at least one data source associated with the individual includes geo-spatial and contextual information of a detected situational condition occurring within an environment surrounding the individual as identified by at least one sensory device;
  an executable portion that generates a notification, provided to the individual, of a reason for said at least temporary prevention of the execution of the action; and
  an executable portion that, upon receiving the notification, overrides the execution of the action from being at least temporarily prevented via explicit feedback from the individual indicating that the reason was a particular point-in-time occurrence and is exempt from being utilized as a data point in the at least one data source for future occurrences of a similar type that would cause execution of a future action from being at least temporarily prevented.

14. The computer program product of claim 13, wherein the action associated with the voice command is performable by a computing device.

15. The computer program product of claim 13, wherein the causing of the action associated with the voice command to be at least temporarily prevented from being executed is performed utilizing a cognitive analysis of the at least one data source.

16. The computer program product of claim 13, wherein the at least one data source includes at least one of previous voice commands received from the individual and previous actions performed in response to receiving previous voice commands received from the individual.

17. The computer program product of claim 13, wherein the at least one data source includes a cognitive profile of the individual.

18. The computer program product of claim 13, wherein the computer-readable program code portions further include:
  an executable portion that determines a modified action based on the received voice command and the at least one data source associated with the individual; and
  an executable portion that causes the modified action to be executed.

* * * * *